July 25, 1967  H. G. BRAKEBILL  3,332,440
SEQUENTIALLY-ACTUATED MULTIPLE-FUNCTION CONTROL VALVE
Filed March 19, 1965

INVENTOR
Harold Gene Brakebill

BY
*Birch & Birch*
ATTORNEYS

United States Patent Office 3,332,440
Patented July 25, 1967

3,332,440
SEQUENTIALLY-ACTUATED MULTIPLE-FUNCTION CONTROL VALVE
Harold Gene Brakebill, Knoxville, Tenn., assignor to Robertshaw Controls Company, Richmond, Va., a corporation of Delaware
Filed Mar. 19, 1965, Ser. No. 441,282
16 Claims. (Cl. 137—595)

This invention relates to sequentially-actuated multiple-function control valves and more particularly, to novel control valve means for controlling both the hot water and cold water lines of four-pipe air conditioning systems and the like.

It is an object of this invention to provide a new and novel sequentially-actuated multiple-function control valve which controls separate and isolated hot and cold water flow systems, respectively, in the same valve body.

Another object of this invention is to provide a new and novel sequentially-actuated multiple-function control valve including first and second valve means sequentially actuated from a common displaceable actuator means, one of said valves in any given cycle of sequential operation being direct-acting and the other of said valves being reverse-acting throughout the respective proportional bands thereof.

Still another object of this invention is to provide new and novel control means for multiple heat exchange media type systems, said control means being economical and compact.

Still another object of this invention is to provide a balanced sequence valve having a predetermined dead zone in its operating cycle, wherein the dead zone is not affected by supply pressures.

Yet another object of this invention is to provide a balanced sequence valve having a plurality of valve poppets therein and novel biasing means for said valve poppets, whereby the dead zone of the sequence valve may be selectively adjusted with respect to the stroking range of the said valve.

Still another object of this invention is to provide a sequence valve comprising a pair of sequentially actuated valve means actuated from a common coaxial stem, said stem having new and novel floating thrust button means adjacent each of said valve means.

These and other objects of this invention will become more fully apparent with reference to the following specification and drawing, which relate to a preferred embodiment of the invention.

Figure 1:
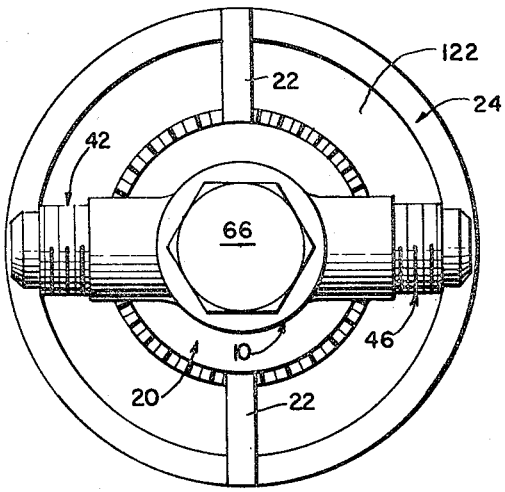
FIGURE 1 is a bottom plan view of a sequence valve and actuator means of the present invention.
Figure 2:
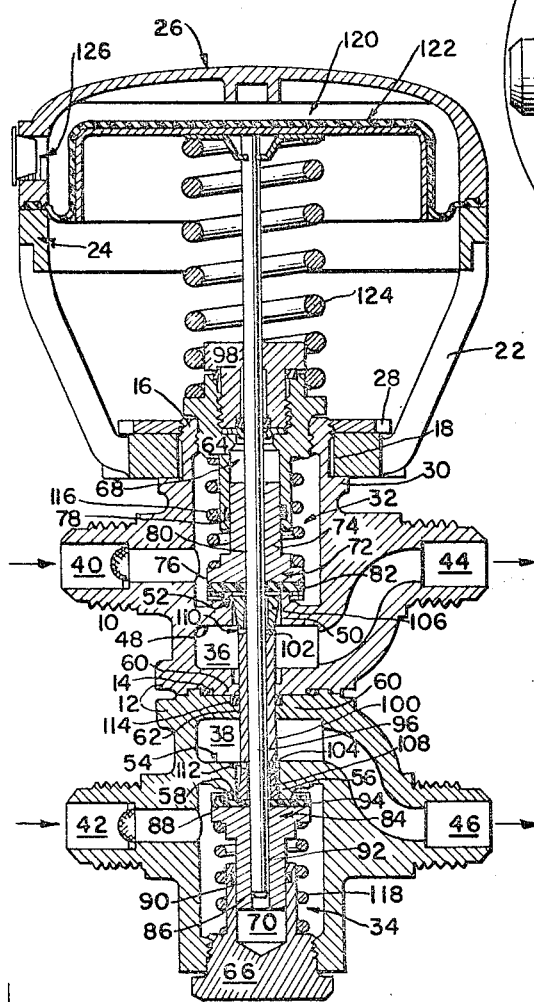
FIGURE 2 is a side elevation of the invention with the sequentially-actuated multiple-function control valve thereof shown in cross section.

Referring in detail to the drawings and more particularly to FIGURES 1 and 2, the preferred embodiment of the invention illustrated therein is shown to include a two-part hollow valve body or housing 10 joined together at its central portion via conformal flange means 12 and O-ring seal 14. Alternatively, the valve body 10 may be of unitary construction.

The upper end 16 of the valve body 10 is externally threaded and extends through the central bore 18 of a grommet or sleeve portion 20 integrally mounted on the dependent arms 22 of the spider portion 24 of a valve actuator 26.

A sprocket nut 28, cooperating with the threaded upper end 16 of the valve body 10, is provided in juxtaposition with the upper surface of the grommet 20 to draw an integral annular shoulder 30 on the valve body 10 into positive engagement with the lower surface of the grommet 20. Thus, the valve body 10 and valve actuator 26 are positively interlocked to form an integral structure.

The valve body 10 contains first and second inlet chambers 32 and 34 associated, respectively, with first and second outlet chambers 36 and 38. The respective chambers are coaxially arranged throughout the valve body 10 with the said outlet chambers being adjacent and centrally located in the embodiment shown. First and second ported inlet couplings 40 and 42 are respectively provided for the first and second inlet chambers 32 and 34. In like manner, first and second ported outlet couplings 44 and 46 are respectively provided for the first and second outlet chambers 36 and 38.

The first inlet and outlet chambers 32 and 36 are separated by a first integral radial web or bulkhead 48 in the valve body 10 having an axial bore 50 therein peripherally defined by a raised annular valve seat 52 extending into the first inlet chamber 32.

The second inlet and outlet chambers 34 and 38 are separated by a second integral radial web or bulkhead 54 in the valve body 10 having an axial bore 56 therein peripherally defined by a raised annular valve seat 58 extending into the second inlet chamber 34.

The mating flange means 12 of the valve body 10 forms an internal radial third web or bulkhead 60 between the first and second outlet chambers 36 and 38 and includes a bore 62 coaxial with the bores 50 and 56 in the first and second radial webs 48 and 54, respectively.

The fixed component portions of the valve body 10 further include top and bottom end caps 64 and 66, respectively, axially and threadably insertable, respectively, into the first and second inlet chambers 32 and 34 via the respectively adjacent top and bottom ends of the valve body 10. The top end cap 64 has a counterbored cylindrical through-port 68 therein and the bottom end cap 66 has a cylindrical cavity 70 therein, both said port 68 and said cavity 70 being mutually coaxial with the bores 50, 56 and 62 in the webs 48, 54 and 60, respectively.

A first poppet valve 72 having a cylindrical shank portion 74 and a radially stepped enlarged head portion 76 is mounted in the first inlet chamber 32 with the said shank 74 thereof internally telescoped in the through-port 68 of the top end cap 64 and pressure sealed therein via an O-ring 78. The said valve 72 includes a through-bore 80 coaxial with the said bores 50, 56 and 62. The valve head 76 is provided with a resilient facing insert 82 adapted to engage the annular valve seat 52 in the first inlet chamber 32.

A second poppet valve 84 having a cylindrical shank portion 86 and a radially stepped enlarged head portion 88 is mounted in the second inlet chamber 34 with the said shank 86 thereof internally telescoped in the cylindrical cavity 70 of the bottom end cap 66 and pressure sealed therein via an O-ring 90. The said valve 84 includes a through-bore 92 coaxial with the said bores 50, 56 and 62. The valve head 88 is provided with a resilient facing insert 94 adapted to engage the annular valve seat 58 in the second inlet chamber 34.

Figure 3:
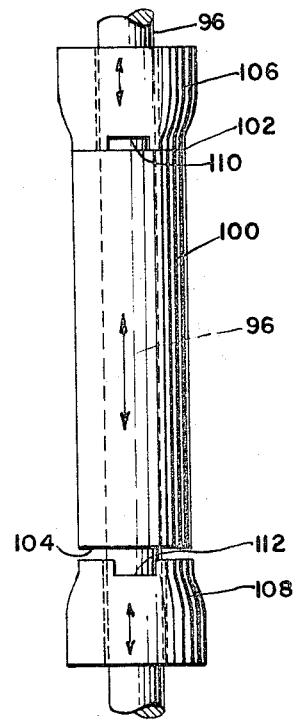
FIGURE 3 is a detailed side elevation of the common valve actuator means of the present invention.
Figure 4:
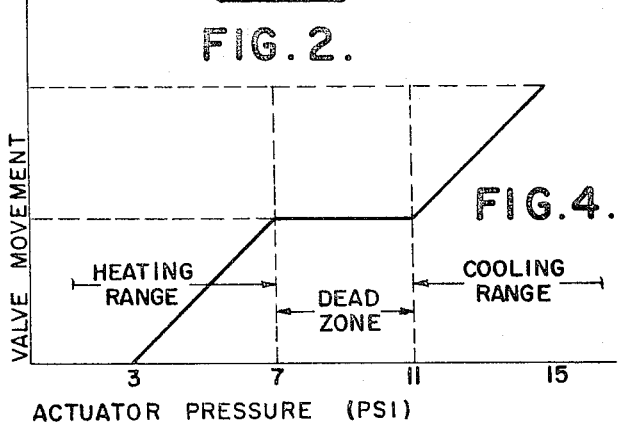
FIGURE 4 is a signal pressure versus valve position characteristic of the sequence valve of FIGURE 2.

Referring jointly to FIGURES 1, 2 and 3 a valve actuator shaft 96 extends from the valve actuator 26 through an adaptor bushing 98 in the top end cap 64 and thence, coaxially, through the through-port 68, first valve bore 80, bore 50, bore 62, bore 56 and second valve bore 92 into the cylindrical cavity 70 in the bottom end cap 66.

Intermediate the first and second bores 50 and 56 and either integrally formed or brazed to the valve actuator shaft 96 is a coaxial enlarged cylindrical actuator portion 100 having first and second shoulders 102 and 104 adjacent the first and second valve poppets 72 and 84, respectively.

Intermediate the first shoulder 102 of the actuator portion 100 and the resilient facing insert 82 of the first poppet valve 72 is a first floating thrust button 106, coaxially mounted on the shaft 96 for free axial displacement relative thereto.

Likewise, intermediate the second shoulder 104 of the actuator portion 100 and the resilient facing insert 94 of the second poppet valve 84 is a second floating thrust bottom 108, coaxially mounted on the shaft 96 for free axial displacement relative thereto.

The first and second thrust buttons 106 and 108 are provided, respectively, with preselected contours providing predetermined flow characteristics, as will be hereinafter more fully described and are provided, respectively, with first and second substantially rectangular, radially disposed and axially extending slots 110 and 112 commencing at the junctures of the said buttons and the respectively associated shoulders 102 and 104 on the actuator portion 100.

The actuator portion 100 is pressure sealed in the bore 62 of the web 60 via an O-ring 114, whereby the first and second outlet chambers 36 and 38 remain pressure isolated.

The first and second poppet valves 72 and 84 act in mutual opposition and are biased closed by means of first and second coaxially disposed coiled compression springs 116 and 118, respectively.

The valve actuator 26 is shown as including a flexible walled pressure chamber 120 having a flexible wall and piston assembly 122 connected to the upper end of the actuator shaft 96, whereby axial displacement of the shaft 96 as a function of pressure variations in the said chamber 120 are effected. A coaxial compression return spring 124 extends from the valve body 10 to the piston assembly 122, whereby the actuator shaft 96 is biased towards its uppermost axial position. A pressure inlet 126 is provided for the pressure chamber 120.

*Operation*

Referring jointly to FIGURES 1, 2, 3 and 4, the operation of the invention will now be described.

Assuming first that no actuating pressure is being supplied, via the pressure inlet 126, to the pressure chamber 120 of the valve actuator 26, the return spring 124 will force the piston diaphragm assembly 122 to the uppermost possible position in the chamber 120. This will cause the first annular shoullder 102 to engage the first thrust button 106 and force same into engagement with the resilient facing insert 82 on the first poppet valve 72, thereby displacing the said valve 72 vertically via its cylindrical shank portion 74 telescoping into the bore 68 of the top end cap 64. As a result, the first bias spring 116 is compressed and the first poppet valve 72 is constrained to fully open position with respect to the first annular valve seat 52.

Assuming that a source of fluid such as heating medium is coupled with the first inlet coupling 40, the maximum designed flow rate will occur between the said first inlet coupling 40 and the first outlet coupling 44 via the first inlet chamber 32, bore 5 and first outlet chamber 36.

As the signal pressure supplied to the pressure chamber 120 of the valve actuator 26 is increased, predetermined inversely proportional flow rates through the bore 52 will be effected by the first poppet valve 72, the latter being gradually closed by the first bias spring 116 in response to the resulting downward displacement of the actuator shaft 96 in response to increasing signal pressure.

Once the first valve 72 is closed (seated on the first annular valve seat 52), both the first and second thrust buttons 106 and 108 will be floating free of any actuating contact of the respectively associated first and second poppet valves 72 and 84. This condition will exist over a pressure range determined by the spacing between the said valves, the dimensions of the actuator portion 100 and the strengths of the return spring 124 and the second bias spring 118. Thus, even during a continuous signal pressure rise in the chamber 120 and the resulting full stroke actuation of the actuator shaft 96, there will be a predetermined dwell period in which there will be no proportional flow control for either the systems coupled to the first inlet and outlet means 40 and 44 or the separate system coupled to the second inlet and outlet means 42 and 46.

The availability of such a dwell period in a composite control for separate systems, such as, for example, wherein the system connected with the second inlet and outlet means 42 and 46 is a cooling fluid flow system cooperatively associated with the heating fluid flow system set forth above, provides a stable control state wherein for example, a space thermostat common to both said systems is responding to a temperature which, based on the selected operating constraints for the systems, is of a magnitude high enough to justify closing of the heating medium but not so high as to justify initiation of the flow of cooling medium.

The second poppet valve 84 is actuated by the shaft 96 via the second annular shoulder 104 and second thrust button 108 and provides a directly proportional flow change between the second inlet 42 and the second outlet 46 in response to increases in signal pressure in the chamber 120. Thus, the second bias spring 118 acts in opposition to such a signal pressure increase.

In similar manner to the first poppet valve 72, the second poppet valve 84 is axially displaced via the guiding telescopic action of its cylindrical shank 86 in the cylindrical cavity of the bottom end cap 66.

During the above-defined operating sequence or in a reversed sequence, one end of the actuating collar 100 and the respectively associated one of the thrust buttons 106 and 108 must disengage itself from the respective facing insert 82 or 94 on that one of the poppet valves 72 or 84 which was last closed in the operating sequence.

Because of the overhanging configuration of the valve heads 76 and 88 with the raised annular valve seats 52 and 58, respectively, the first and second poppet valves 72 and 84 are provided with a surface area substantially balancing out the effects of upstream pressure from the inlets 40 and 42, respectively, on the stepped portions of the said valve heads.

In obviating a condition of balance of the poppet valves 72 and 84 with respect to downstream pressures, in the outlet chambers 36 and 38, respectively, the sliding fit between the main actuating shaft 96, thrust buttons 106 and 108 and valve poppets 72 and 84 of the present invention provide a flow path for fluid from the slots 110 and 112 in the said thrust buttons along the shaft 96 into the cylindrical cavities 68 and 70, respectively, which telescopically receive the shanks 74 and 86, respectively, of the said first and second poppet valves. Thus, both ends of the poppet valves are exposed in opposed relationship to the downstream pressures in the respectively associated outlet chambers 36 and 38.

The respective facing inserts 82 and 94 on the first and second poppet valves 72 and 84 are mounted such that only the peripheral portions thereof are anchored and the central portions thereof are free to move away from the respective faces of the said valves due to their natural resilience. Thus, prevention of a completely flush coextensive surface engagement between the said facings and the respective thrust buttons 106 and 108 is prevented due to the arcuate shape assumed by the resilient inserts as the central portions thereof move away from the said valve faces and sticking between the said buttons and facings is obviated.

The cross-sectional shape of the thrust buttons 106 and 108 are contoured to predetermined functional characterizing curves, whereby preselected flow patterns and rates are effected for the various displacements of the poppet valves 72 and 84, respectively.

As can be seen from the foregoing specification and drawings this invention provides a novel and refined sequence type control valve for multiple-function systems.

It is to be understood that the particular embodiment shown and described herein is for the sake of example and is not intended to limit the scope of the appended claims.

What is claimed is:

1. A sequence valve comprising first and second inlet means, first and second outlet means, first and second valve means interconnecting, respectively, said first and second inlet means with said first and second outlet means, common actuating means for said valve means having a predetermined operating stroke, contact means on said actuating means, cooperating means on each of said valve means engageable by said contact means, said contact means and said actuating means being inoperable upon said valve means over a predetermined portion of the said operating stroke of said actuating means, said contact means including an integral abutment on said actuating means and floating thrust transmitting means intermediate said abutment and each of said cooperating means on said valve means, said thrust transmitting means being respectively constrained by said integral abutment to follow said actuating means in a predetermined direction of displacement thereof.

2. The invention defined in claim 1, wherein said sequence valve further includes first and second bias means for said first and second valve means, respectively, said valve means being in mutual opposition and said bias means acting to normally maintain said valve means closed.

3. The invention defined in claim 1, wherein said first and second valve means comprise, respectively, first and second flow ports, first and second hollow valve poppets cooperating, respectively, with said flow ports to control flow therethrough, said poppets and said flow ports being coaxially disposed with respect to a portion of said common actuating means to respectively opposite sides of said integral abutment and floating thrust transmitting means; said portion of actuating means comprising an axially displaceable shaft; said floating thrust transmitting means comprises first and second thrust buttons loosely and concentrically mounted on said shaft on either side of said integral abutment adjacent said cooperating means on said first and second valve means, respectively; and wherein said cooperating means comprise first and second resilient facing inserts on said first and second valve poppets.

4. The invention defined in claim 3, wherein said thrust buttons each include a radial flow channel opening immediately adjacent said abutment and said shaft effecting the admission of fluid between said thrust buttons and each of said abutments, said shaft and along said shaft through said hollow valve poppets.

5. The invention defined in claim 3, wherein said resilient facing inserts are peripherally fixed to said valve poppets and are free from said valve poppets within the central portions thereof.

6. The invention defined in claim 3, wherein said thrust buttons each include a radial flow channel opening immediately adjacent said abutment and said shaft effecting the admission of fluid between said thrust buttons and each of said abutments, said shaft and along said shaft through said hollow valve poppets; and wherein said resilient facing inserts are peripherally fixed to said valve poppets and are free from said valve poppets within the central portions thereof.

7. The invention defined in claim 3, wherein said thrust buttons are contoured in preselected flow characterizing curves effecting a predetermined programming of flow through each of said flow ports as a function of the respective axial displacements of said poppet valves.

8. The invention defined in claim 3, wherein said sequence valve further includes a valve body containing said inlet, outlet and valve means, said valve body being open at both ends, first and second end caps in the ends of said valve body, inward coaxial hollow extensions on said end caps, and bore means in said end caps for coaxially receiving a portion of said common actuating means; and wherein said first and second hollow valve poppets, respectively, are telescopically mounted with respect to said inward coaxial hollow extensions on said first and second end caps.

9. The invention defined in claim 3, wherein said sequence valve further includes a valve body containing said inlet, outlet and valve means, said valve body being open at both ends, first and second end caps in the ends of said valve body, inward coaxial hollow extensions on said end caps, and bore means in said end caps for coaxially receiving a portion of said common actuating means; and wherein said first and second hollow valve poppets, respectively, are telescopically mounted with respect to said inward coaxial hollow extensions on said first and second end caps; and further wherein said thrust buttons each include a radial flow channel opening immediately adjacent said abutment and said shaft effecting the admission of fluid between said thrust buttons and each of said abutments, said shaft and along said shaft through said hollow valve poppets into said inward coaxial hollow extensions on said end caps.

10. The invention defined in claim 3, wherein said sequence valve further includes a valve body containing said inlet, outlet and valve means, said valve body being open at both ends, first and second end caps in the ends of said valve body, inward coaxial hollow extensions on said end caps, and bore means in said end caps for coaxially receiving a portion of said common actuating means; and wherein said first and second hollow valve poppets, respectively, are telescopically mounted with respect to said inward coaxial hollow extensions on said first and second end caps; and further wherein said thrust buttons each include a radial flow channel opening immediately adjacent said abutment and said shaft effecting the admission of fluid between said thrust buttons and each of said abutments, said shaft and along said shaft through said hollow valve poppets into said inward coaxial hollow extensions on said end caps; and wherein said resilient facing inserts are peripherally fixed to said valve poppets and are free from said valve poppets within the central portions thereof.

11. The invention defined in claim 1, wherein said thrust transmitting means is provided with flow characterizing means adjacent each said valve means effecting a predetermined programming of flow through each of said valve means as a function of the displacement of said actuating means.

12. In a valve means including a valve head, a valve seat, a flow port in said valve seat, and a valve actuator extending through said flow port toward said valve head; the invention comprising thrust transmitting reference means on said actuator, and floating thrust transmitting means intermediate said reference means and said valve head constrained by said reference means to unseat said valve head from said valvet seat in a preselected direction of operation of said valve actuator; wherein said floating thrust transmitting means is provided with flow characterizing means adjacent said valve head effecting a predetermined programming of flow through said flow port as a function of the displacement of said valve actuator.

13. In a flow control means including a hollow coaxially bored poppet valve having a valve head, a valve seat, a flow port in said valve seat, and a valve actuator extending through said flow port and said poppet valve, said poppet valve being housed telescopically in a bottom bore; the invention comprising a resilient facing insert in said valve head, thrust transmitting reference means on said actuator, floating thrust transmitting means intermediate said reference means and said facing insert constrained by said reference means to engage said insert and unseat said valve head from said valve seat in a preselected direction of operation of said valve actuator, and fluid vent means in said floating thrust means communicating from said flow port along said actuator and through said poppet valve into said hollow bore effecting a balancing of said poppet valve with respect to the pressure on the facing insert side of said valve head.

14. The invention defined in claim 13, wherein said floating thrust transmitting means is provided with flow characterizing means adjacent said valve head effecting a predetermined programming of flow through said flow port as a function of the displacement of said valve actuator.

15. The invention defined in claim 13, wherein the interface portion of said resilient facing insert which is mutually engageable with said floating thrust transmitting means is free to move with respect to said valve head.

16. The invention defined in claim 13, wherein said floating thrust transmitting means is provided with flow characterizing means adjacent said valve head effecting a predetermined programming of flow through said flow port as a function of the displacement of said valve actuator; and wherein the interface portion of said resilient facing insert which is mutually engageable with said floating thrust transmitting means is free to move with respect to said valve head.

References Cited

UNITED STATES PATENTS

| | | | |
|---|---|---|---|
| 2,009,102 | 7/1935 | Bern | 137—595 X |
| 2,704,649 | 3/1955 | Ellenberger | 137—630.13 X |
| 2,807,281 | 9/1957 | Allen | 137—627.5 |
| 3,025,881 | 3/1962 | Freeman | 137—627.5 |
| 3,063,469 | 11/1962 | Freeman | 137—627.5 |

FOREIGN PATENTS 923,023   4/1963   Great Britain.

CLARENCE R. GORDON, *Primary Examiner.*